(12) United States Patent
Bott

(10) Patent No.: US 7,490,543 B2
(45) Date of Patent: Feb. 17, 2009

(54) OVEN FOR BAKING BATTER GOODS

(75) Inventor: Ulrich Bott, Wilhelm-Leuschner-Strasse 175A, D-64347 Griesheim (DE)

(73) Assignees: Topsy Turvy Corporation, Lewes, DE (US); Ulrich Bott, Griesheim (DE)

( * ) Notice: Subject to any disclaimer, the term of this patent is extended or adjusted under 35 U.S.C. 154(b) by 608 days.

(21) Appl. No.: 11/100,313

(22) Filed: Apr. 6, 2005

(65) Prior Publication Data
US 2005/0279342 A1    Dec. 22, 2005

(30) Foreign Application Priority Data
May 27, 2004    (EP)    ................. 04012619

(51) Int. Cl.
A47J 37/00    (2006.01)
(52) U.S. Cl. ................. 99/386; 99/443 C
(58) Field of Classification Search ........... 99/327–333, 99/352–355, 342, 372–384, 385–392, 443 C, 99/427, 443 R, 450.1, 450.4; 432/32, 75, 432/242, 274, 302; 426/231, 496; 198/340; 118/13, 15, 24, 25, 42; 126/21 A, 41 R
See application file for complete search history.

(56) References Cited

U.S. PATENT DOCUMENTS

| 4,417,508 A | * | 11/1983 | Haas et al. | ............. 99/355 |
| 4,438,685 A | * | 3/1984 | Haas et al. | ............. 99/342 |
| 5,032,413 A | * | 7/1991 | Haas et al. | ............. 426/231 |
| 5,032,414 A | * | 7/1991 | Haas et al. | ............. 426/231 |
| 5,955,129 A | * | 9/1999 | Haas et al. | ............. 426/231 |

FOREIGN PATENT DOCUMENTS

| DE | 164 277 | 10/1905 |
| DE | 199 42 806 | 3/2001 |
| EP | 0 061 545 | 3/1981 |
| EP | 0 096 256 | 5/1983 |

OTHER PUBLICATIONS

European Search Report dated Jan. 26, 2005.

* cited by examiner

*Primary Examiner*—Timothy F. Simone
(74) *Attorney, Agent, or Firm*—Collard & Roe, P.C.

(57) ABSTRACT

An oven for baking batter goods, in particular, a wafer oven, has several baking plates assigned to one another in pairs, and at least one heat source for tempering or heating the baking plates. Particularly efficient production of wafers or similar products can be achieved in that the baking plates are mounted in a wheel-like carrier that can be rotated about an axis so that they extend essentially radially away from the axis, at a distance from it. Furthermore, at least one heat exchanger may be assigned to the baking plates, in each instance, through which a medium tempered by a heat source and supplied by way of a ring line flows.

16 Claims, 2 Drawing Sheets

OVEN FOR BAKING BATTER GOODS

CROSS REFERENCE TO RELATED APPLICATIONS

Applicant claims priority under 35 U.S.C. §119 of European Application No. 04 012 619.5 filed May 27, 2004.

BACKGROUND OF THE INVENTION

1. Field of the Invention

The present invention relates to an oven for baking batter goods, particularly a wafer oven, having several baking plates assigned to one another in pairs, and at least one heat source for tempering the baking plates.

2. The Prior Art

In a wafer baking oven of this type, for example one known from DE 199 42 806 A1, the baking plates are connected with one another by way of an endless baking tong chain that circulates. In this connection, the rectangular baking plates are connected with one another in pairs, by way of a hinge. The hinge is arranged at one of the short sides, so that the plates can be pivoted between a V-shaped open position and a closed position in which they lie essentially parallel to one another.

In these known wafer baking ovens, baking of the wafers takes place continuously, whereby a liquid batter is poured on between an open pair of baking plates, for example, after which the baking plates are closed and locked. The water contained in the batter evaporates between the heated baking plates, and thereby a wafer is formed, under pressure, between the baking plates. The wafer is baked to completion between the baking plates by supplying additional heat. At the end of the circuit described by the pairs of baking plates, the plates are opened again, so that the finished wafer sheet can fall out and be passed to further processing.

In this connection, heating of the baking plates generally takes place by way of direct gas firing. For this purpose, a burner group is arranged under each conveyor segment of the gripper chain. In this way, a first baking plate, the bottom plate, is heated in the upper segment, and the baking plate assigned to or associated with it, the top plate, is heated in the upper segment.

The burner groups consist of pipes that supply a gas mixture to the burners, which can pivot, for example, and are equipped with nozzles. The known wafer oven burners frequently have to be operated with an over-rich gas mixture, i.e. an air/fuel mixture that does not contain sufficient oxygen for complete combustion, since only in this way is it possible to produce a soft, uniform carpet of flames. Consequently, in order to achieve complete combustion, additional oxygen has to be drawn from the air in the oven. This oxygen is sufficiently available for the burner assigned to the lower segment. The burner located in the upper segment, however, is influenced by the waste gases of the bottom burner. In order to produce an acceptable flame profile in the burner assigned to the upper segment as well, fresh air is drawn through the oven using a venting fan. This air is heated on its path through the heated space and, in this connection, transports energy out of the oven, which is therefore not available to the baking process.

The connection between the baking plates by way of the hinge at their short sides frequently makes it necessary for additional reinforcing elements, e.g. casting tongs, to be assigned to the baking plates. But if the distance between the burners and the baking plates is chosen so that the back of the baking plates passes precisely through the hottest part of the flames, i.e. the flame length in the continuous operating state, these reinforcement elements disrupt the flames. This disruption leads to an increase in emissions. In known ovens, the distance of passage through the flames is therefore selected so that the back of the baking plates passes not through the hottest region of the flames, but rather at a greater distance from it.

The effects as described result in a comparatively low degree of effectiveness of about 50% for the known wafer ovens. According to thermodynamic studies, the waste gas losses, which include the air that is additionally drawn through and heated, are approximately 36%. Furthermore, with conventional burners, it is possible to adhere to the waste gas values that apply worldwide, particularly for CO, only under optimal conditions and with a precise adjustment. In most cases, however, the wafer baking ovens produce a multiple of the permissible emissions.

Another disadvantage of the known wafer baking ovens is that only gaseous fuels can be used, but these fuels are not available in sufficient amount at every production location.

Furthermore, it is considered to be disadvantageous that the size of the baking plates is limited to approximately 350 mm×700 mm, since otherwise it is difficult to apply the holding forces for closing the pair of baking plates during the baking process. Making the baking plates larger could, however, clearly increase the production yield while increasing the total machine volume only slightly, and this increase in size would have an advantageous effect on the production costs of the oven, in comparison with its capacity. At the same time, making the baking plates larger also results in energy advantages, since the mass to be heated up, as well as the housing surface, increase relatively less in proportion, in comparison with the capacity increase gained.

Furthermore, wafer baking ovens are known in which the pairs of baking plates are arranged on a rotating shaft or a round table, either parallel or perpendicular to the direction of circulation. Heating of these pairs of baking plates takes place by way of an electrical resistance heater element that is screwed onto them, or by way of hot water or steam that is passed into the baking plates under a pressure of approximately 16 bar, through elongated hole bores. In these known ovens, the number of pairs of baking plates is limited to a maximum of twelve, because of the arrangement in the direct vicinity of the shaft, at a baking plate size of approximately 290 mm×470 mm, so that the capacity of these known systems is low. In addition, when using hot water or steam as the tempering or heating medium, corrosion frequently occurs at the baking plates and the entire system that conducts the medium. This corrosion results in problems, particularly in connection with the high pressure of the tempering medium, approximately 16 bar. Furthermore, the formation of channels within the baking plates is difficult and expensive. The alternative heating of the individual pairs of baking plates by way of electrical resistance heater elements is usually not economically efficient, because of the high costs for electricity.

SUMMARY OF THE INVENTION

Against this background, it is an object of the present invention to provide an oven for baking batter goods, of the type stated initially, which avoids the problems described above and produces a good baking result, with a good degree of effectiveness.

These and other objects are accomplished, in accordance with the invention, by mounting the baking plates in a wheel-like carrier that can be rotated about an axis, so that they extend essentially radially away from the axis, at a distance from it, and assigning at least one heat exchanger to the baking plates, in each instance, through which a medium tempered by a heat source flows at a pressure of less than 12 bar, preferably less than 7 bar. By arranging the baking plates at a distance from the axis of the wheel-like carrier, substantially more baking plates can be arranged in the oven than in the known arrangement of the baking plates close to the axis. At the same time, particularly uniform and continuous tempering of the baking plates is made possible by means of the heat exchangers assigned to the baking plates, thereby improving the baking result. In addition, the oven is not subject to the regulations for pressurized containers, at such a low pressure of the medium used for tempering, so that expensive and complicated seal and strength tests are not required.

The number of feed lines for supplying the medium to the heat exchangers can be minimized by providing a ring line through which the tempered medium flows out of the heat source. The ring line can then be connected with the individual heat exchangers. In this connection, the ring line does not have to form a circulation system for the medium; instead, the ring line is preferably a distributor line that is formed in ring shape at least in some regions, from which the feed lines to the baking plates branch off.

The capacity of the oven can be significantly increased by means of a higher number of baking plates, while keeping the construction space the same, in that the pairs of baking plates, in their closed state, in which they lie at least approximately against one another, extend essentially in a plane that passes through the axis of the carrier and a direction that extends radially away from it. Consequently, in their closed state, the pairs of baking plates are positioned perpendicular to the direction of rotation of the wheel-like carrier. This arrangement furthermore facilitates filling the baking plates with a batter to be baked, as well as removal of the finished, baked wafers or like products from the oven.

In order to arrange a large number of pairs of baking plates in the oven, the carrier is preferably a spoke wheel, to which the baking plates are attached in a region removed from the axis. The carrier can be configured as a wheel with spokes on one side, so that in cross-section, an approximately C-shaped configuration of the wheel is obtained. Alternatively, the carrier can be formed by a drum wheel that also is approximately C-shaped in cross-section.

In this connection, the ring line, according to the invention, can be connected with a rotational feed arranged close to the axis, by way of a line that runs essentially radially. The connection between the ring line and the heat exchangers of the baking plates can take place by way of branching lines, whereby the heat exchangers in turn are connected with a collecting line that leads to the heat source, by way of reflux lines. The ring line for supplying tempered medium to the heat exchangers is either positioned on one side with the collecting line for reflux of the medium, or the ring line and the collecting line are arranged on opposite sides of the wheel-shaped carrier.

According to a preferred embodiment of the invention, the heat source for tempering the medium is a heat exchanger, to which an electric heater, a solar or geothermal power plant, or particularly a combustion system for solid, liquid, or gaseous fuels is assigned. This combustion system can be operated with the most varied kinds of fuels that are inexpensively available at the production location. Furthermore, it is possible to control the combustion process so that an optimal degree of effectiveness and as low as possible an emission of harmful substances is achieved. In this manner, not only can the overall energy consumption of the system be significantly reduced, but also the strict legal waste gas limits that apply in many locations can be adhered to.

A thermal oil that is safe for foods, that is one that has been approved contact with foods, for example, can be used as the medium that is heated by the heat source and passed through the heat exchangers of the baking plates; the known problems of corrosion formation are avoided with such an oil, to a great extent. A preferred baking temperature for wafers, at about 150 to 220° C., can readily be achieved at a low excess pressure of the oil, at about 2 bar. Therefore, the design requirements concerning pressure seals of the lines and the heat exchangers are less than in the case of known ovens operated with hot water or steam.

The heat exchangers assigned to or associated with the ovens are preferably attached on the side of the baking plates that faces away from the batter to be baked. Fundamentally, it is also possible to pass the tempering medium directly through the baking plates, in corresponding bores, for example, but the heat exchangers are preferably formed by means of metal sheets connected with the baking plates, which define channels for uniform heating of the baking plates. In contrast to known wafer baking ovens, in which the baking plates are passed through open flames and therefore heated intermittently, an almost constant and uniform temperature level prevails in the structure of the baking plates according to the invention, with heat exchangers, during the entire baking process. In this way, not only are energy costs lowered but also the baking result is improved.

If the greatest possible number of pairs of baking plates is supposed to be arranged in the oven, the distance between the pairs of baking plates must be kept small. This arrangement can be achieved, among other things, by integrating flange-like connecting elements into the heat exchangers, for connecting the heat exchangers with the ring line by way of a hose or the like. These connecting elements are, in particular, flat, so that the thickness of the baking plates, with the heat exchangers, can be kept low. The connecting elements can be integrated into the heat exchangers so that the connecting elements are prevented from tearing out of the thin sheet metal of the heat exchangers.

According to a preferred embodiment of the invention, the baking plates are configured to be at least approximately rectangular, whereby every other baking plate is rigidly connected with the carrier, as a bottom plate, and the other baking plates are connected with one of the bottom plates, in each instance, as top plates, on a long side of the baking plates, by way of a hinge, so as to pivot. In this connection, several hinges can be aligned approximately parallel to the axis of the carrier. Preferably, several closures for locking the baking plates in their closed state are provided on the long sides of the baking plates that lie opposite the hinges.

By means of this configuration, the forces that act on the hinge as well as the closures in the closed state of the baking plates are significantly reduced. It is therefore possible to achieve even clearly larger dimensions of the baking plates, whereby the long sides of the baking plates extend essentially parallel to the axis of the carrier, and the short sides of the baking plates project radially away from the axis of the carrier. This arrangement of the locking devices and the hinges on the long sides of the baking plates has the result that the holding forces that occur have to be absorbed over only a short length of the baking plates. The forces are distributed over several closures and hinge elements, for one thing, so that these closures and hinge elements can be dimensioned with a correspondingly smaller size. At the same time, bending of the baking plates under the steam pressure is also avoided, or at least reduced. The width of the baking plates can therefore be expanded as desired, as a function of the construction space that is available.

In order to make continuous operation of the baking oven according to the invention possible, the top plates can have levers that interact with a cam as the carrier rotates about the axis, so that the top plates pivot into an open position in which they extend away from the bottom plates in V shape, at a defined point of the path. In this position, the finished, baked wafer can be removed from the pair of baking plates, and subsequently, unbaked batter can be applied to the pair of baking plates. This application can take place, for example, by means of a movable batter pouring mechanism that is assigned to the carrier.

The oven according to the invention is suitable for being fitted with more than 30 pairs of baking plates, preferably more than 50 pairs of baking plates, at a construction height of about 5 m, for example. In comparison with conventional ovens, the pairs of baking plates can have an increased width of approximately 1 or 1.5 m, for example. This increased width, together with the large number of pairs of baking plates, results in a particularly high capacity of the oven, which makes efficient production of wafers or similar products possible.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
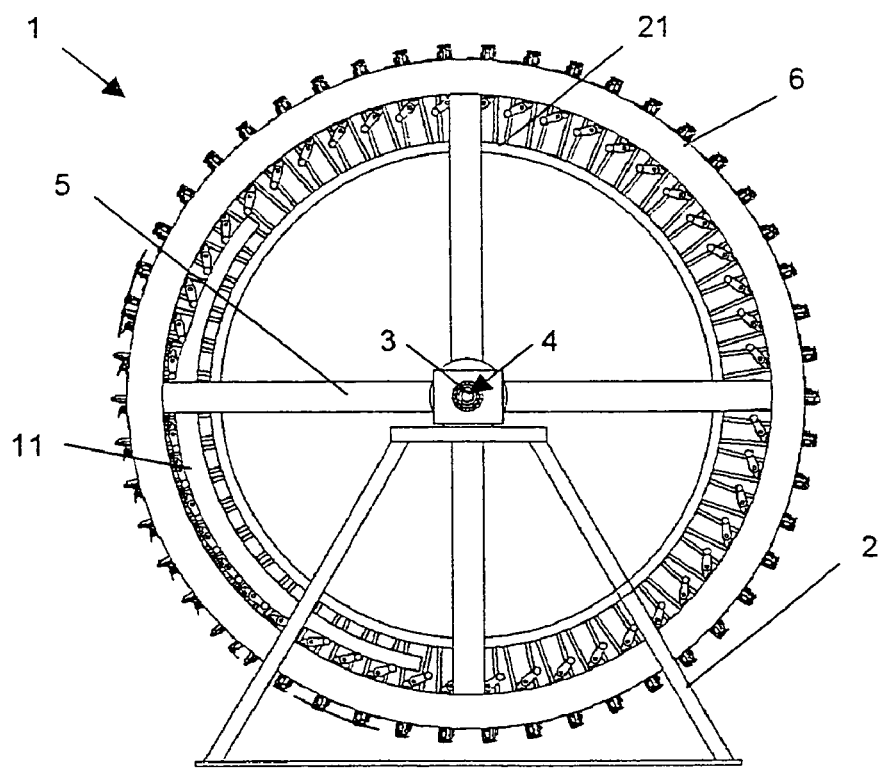
FIG. 1 is a side view of an oven according to an embodiment of the invention.

Referring now to the drawings, the wafer oven 1 shown is substantially structured as a spoke wheel that is mounted to rotate on a support structure 2, by means of a bearing 3. Several spokes 5 point away from a shaft 4 mounted in bearing 3, and hold a ring 6 that is structured in segments, for example.

Figure 3:
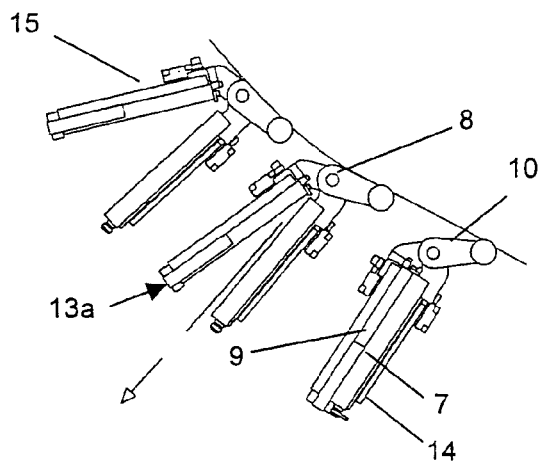
FIG. 3 shows the opening of pairs of baking plates in the oven according to FIG. 1.
Figure 4:
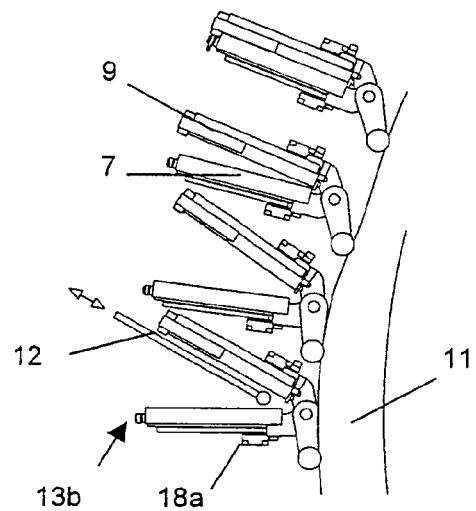
FIG. 4 shows the closing of pairs of baking plates in the oven according to FIG. 1.
Figure 5:
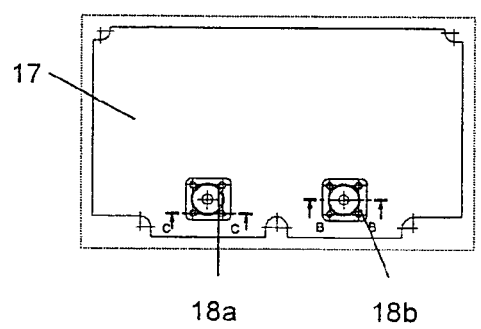
FIG. 5 is a top view of a heat exchanger element for attachment to baking plates in the oven according to FIG. 1.

Several baking plates are mounted in ring 6, whereby the baking plates are assigned to one another in pairs. Each pair of baking plates is made up of a bottom plate 7 rigidly connected with ring 6. As shown in FIGS. 3 and 4, ring 6 is connected with a top plate 9 by way of a hinge 8, which is formed by means of several hinges arranged parallel to one another. Top plate 9 is mounted to pivot on bottom plate 7 by means of hinge 8, and is rigidly connected with a lever 10. The baking plates have a substantially rectangular form and are positioned in wafer oven 1 perpendicular to the direction of rotation, which corresponds to the clockwise direction in FIG. 1. Because of the large number of hinges, the maximal stresses that occur in the baking plates are significantly reduced.

On the left side in FIG. 1, a cam 11 that is arranged in a fixed location is shown, which is arranged and configured so that the levers 10 connected with the top plates 9 can make contact with the cam 11 during a rotation of the ring 6. As a result, top plates 9 are pivoted from a closed position, shown at the bottom of FIG. 3, in which top plates 9 essentially lie flat on bottom plates 7, into an open position shown at the top of FIG. 3, in which top plate 9 projects away from bottom plate 7 in a V shape. By this opening of the pair of baking plates, a wafer or like product that is accommodated in the baking space defined between the two baking plates can be removed from the baking plates, as indicated by the arrow in FIG. 3. Cam 11 is furthermore configured so that top plates 9 are closed again as ring 6 continues to rotate in the clockwise direction, as indicated in FIG. 4. Before that happens, batter, for example, can be introduced into the opened baking space between bottom plates 7 and top plates 9, by means of a batter pouring mechanism 12. In order to completely fill the baking space, batter pouring mechanism 12 can be movable, so that it can be moved into the baking space.

The rectangular baking plates are connected with one another on their side that faces towards shaft 4, by way of hinge 8. On the long side of the baking plates that lies opposite hinge 8, a closure arrangement is provided, which has several pivoting hooks 13a on each of the top plates 9, and corresponding holder bolts 13b on the bottom plates 7. Before the baking plates are opened as in FIG. 3, the baking plates are unlocked by releasing hooks 13a from holder bolts 13b, while the baking plates are locked again after they are closed as in FIG. 4, so that the pairs of baking plates are held closed during the baking process. Since the top plates are attached to the bottom plates by way of several hinge points, and several hooks 13a and several holder bolts 13b are assigned to each pair of baking plates, only low forces act on the individual closure elements over the short sides of the baking plates. In this way, even at large dimensions of the baking plates, the pressure that occurs during the baking process does not result in deformation of the baking plates.

Figure 6:
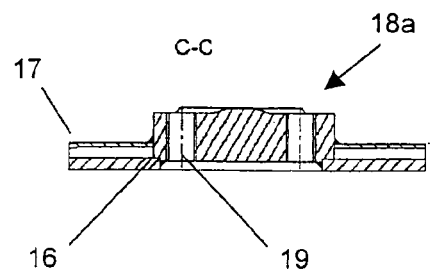
FIG. 6 is a cross-section along the line C-C in FIG. 5.
Figure 7:
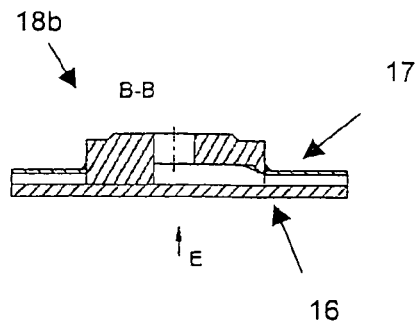
FIG. 7 is a cross-section along the line B-B in FIG. 5.
Figure 8:
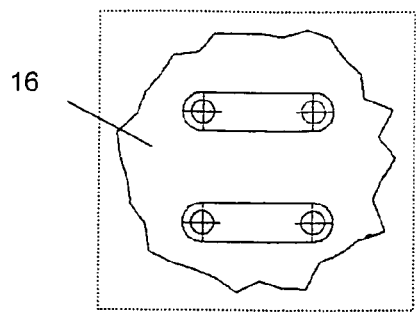
FIG. 8 is a view of a detail of the heat exchanger, seen in the direction of the arrow E in FIG. 7.

A heat exchanger 14 is affixed to bottom plates 7, on their side that faces away from top plates 9, while a heat exchanger 15 is provided on top plates 9, on their side that faces away from bottom plates 7. Heat exchangers 14 and 15, which rest on a large area of the baking plates, are formed, for example, by means of two metal sheets 16, 17 that are welded to one another, in which channels for conducting a tempered medium can be formed by means of beads or the like. In this way, particularly uniform heating of the baking plates can be achieved, thereby influencing the baking result in positive manner. As indicated in FIGS. 5 to 8, connecting elements 18a and 18b are integrated into the heat exchangers; these elements are inserted into top metal sheet 17 through an opening, and welded to it. Furthermore, as is shown in FIGS. 6 and 8, two elongated holes are provided in bottom metal sheet 16, through which connecting elements 18a and 18b can also be welded to bottom metal sheet 16. In addition, connecting elements can have passage bores 19. By way of these passage bores, the heat exchangers can be connected with the baking plates and/or flexible tubes or similar lines can be connected with the connecting elements.

Figure 2:
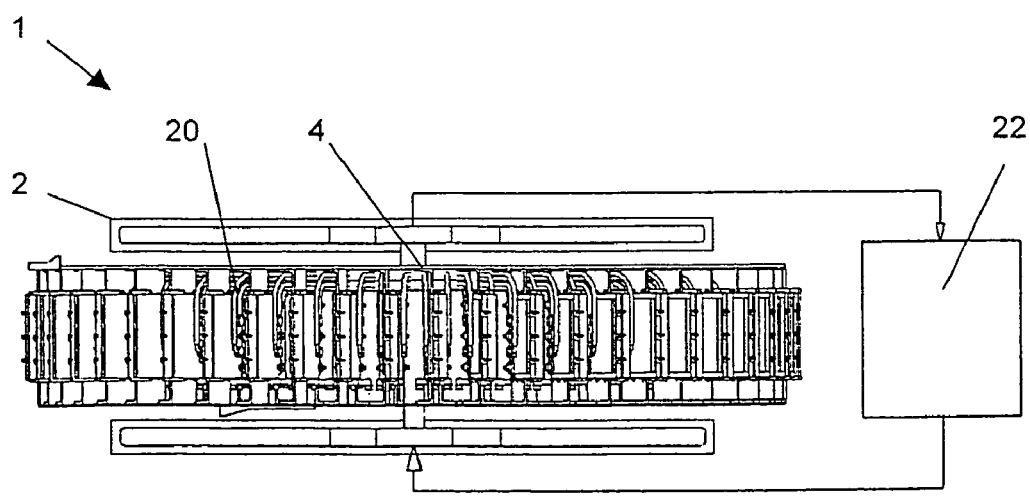
FIG. 2 is a top view of the oven according to FIG. 1.

Heat exchangers 14 and 15 are connected with ring line 21, on the one hand, by way of branching lines configured as hoses 20 in FIG. 2, and with a collecting line, on the other hand. Both ring line 21 and the collecting line run circumferentially in the vicinity of ring 6, so that all the heat exchangers 14 and 15 of the baking plates are supplied with a tempered medium from ring line 21. The medium flows through the heat exchangers and is returned via the collecting line. Both ring line 21 and the collecting line are connected with a heat source 22, indicated schematically in FIG. 2, by way of additional lines and a rotational feed.

This heat source 22 can particularly be a combustion system for solid, liquid or gaseous fuels, which is operated at an optimal degree of effectiveness. The medium used for tempering or heating the baking plates via the heat exchangers is preferably a thermal oil. Preferably, the thermal oil circulates from heat source 22 through heat exchangers 14 and 15 at temperatures of 150 to 220° C. In this connection, the pressure of the thermal oil can lie at approximately 2 bar excess pressure, so that only low requirements with regard to pressure resistance have to be set for the lines and the heat exchangers.

The baking process of a wafer or like product takes place in wafer oven 1 shown, in that batter is applied between an open pair of baking plates during the rotation of ring 6, with the baking plates attached to it, by way of batter pouring mechanism 12. After the pair of baking plates is closed and locked, a wafer is baked between the top plate and the bottom plate, by means of the uniform tempering brought about by the heat exchangers during the rotation of ring 6. After an almost complete revolution, the pair of baking plates is opened again by way of cam 11, so that the wafer drops out of the pair of baking plates or can be removed. Immediately afterward, new wafer batter can be introduced into the open pair of baking plates.

In the embodiment shown, 50 pairs of baking plates are provided in the wafer oven. In this way, a large number of wafers can be produced in continuous operation. The large number also results because of the large dimensions of the baking plates, of approximately 350 mm×1500 mm. Because of the central heating of the medium for tempering the baking plates, the production of wafers is possible in particularly efficient manner and with low energy consumption and low emission of harmful substances.

In the case of conventional ovens, the enclosed volume that can fill with gas in case of the failure of safety mechanisms is relatively large. The present system, with thermal oil as the heat medium, therefore has a lower risk of explosion.

Although only a few embodiments of the present invention have been shown and described, it is to be understood that many changes and modifications may be made thereunto without departing from the spirit and scope of the invention as defined in the appended claims.

What is claimed is:

1. An oven for baking batter comprising:
(a) a carrier rotatable about an axis;
(b) a plurality of baking plates arranged in pairs mounted on said carrier to extend at a distance substantially radially away from said axis;
(c) at least one heat source for supplying heat to the baking plates; and
(d) at least one heat exchanger associated with a respective one of each baking plate through which a medium heated by said at least one heat source flows at a pressure of less than 12 bar;
wherein each pair of baking plates has a closed position in which the baking plates in the pair rest at least approximately against one another and extend substantially in planes that pass through said axis and in a direction that extends radially away from said axis.

2. The oven according to claim 1, wherein the carrier comprises a spoke wheel and the baking plates are attached to said carrier in a region removed from said axis.

3. The oven according to claim 2, further comprising a rotational feed arranged near said axis and a ring line connected via a radial line to said rotational feed for delivering the medium to the heat exchangers.

4. The oven according to claim 3, further comprising a plurality of branching lines connecting said ring line with each heat exchanger and a collecting line leading to the heat source connecting the heat exchangers by way of reflux lines.

5. The oven according to claim 1, wherein the heat source comprises a heat exchanger for heating the medium and an electric heater, a solar or geothermal power plant, or a combustion system for solid, liquid, or gaseous fuels associated with the heat exchanger.

6. The oven according to claim 1, wherein the medium is a thermal oil that is approved for foods.

7. The oven according to claim 3, wherein the heat exchangers associated with each pair of baking plates are attached on the respective sides of the baking plates in the pair that face away from the batter to be baked.

8. The oven according to claim 7, wherein the heat exchangers comprise metal sheets connected with the baking plates to define channels for uniformly heating the baking plates.

9. The oven according to claim 7, wherein the heat exchangers comprise integrated flange-shaped connecting elements for connecting the heat exchangers with the ring line by way of a flexible tube.

10. The oven according to claim 1, wherein each pair of baking plates comprises a bottom plate rigidly Connected with said carrier, and a top plate pivotally connected by a hinge on a longer side of the top plate to said bottom plate.

11. The oven according to claim 10, wherein each hinge is aligned approximately parallel to the axis of the carrier.

12. The oven according to claim 10, further comprising a plurality of closures for locking the baking plates in a closed state provided on a side of the baking plates in each pair of baking plates opposite to the hinge.

13. The oven according to claim 10, wherein the top plate has a lever that interacts with a cam as the carrier rotates along a path about the axis so that the top plate pivots into an open position in which the top plate extends away from the bottom plate to form a V-shape opening at a defined point of the path.

14. The oven according to claim 1, further comprising a movable batter pouring mechanism for filling batter between a pair of baking plates, said movable batter pouring mechanism being associated with the carrier.

15. The oven according to claim 1, wherein said plurality of baking plates comprises more than 30 pairs of baking plates arranged on the carrier.

16. The oven according to claim 15 wherein said oven is a wafer oven and about 50 pairs of baking plates are arranged on the carrier.

* * * * *

UNITED STATES PATENT AND TRADEMARK OFFICE
CERTIFICATE OF CORRECTION

PATENT NO. : 7,490,543 B2  
APPLICATION NO. : 11/100313  
DATED : February 17, 2009  
INVENTOR(S) : Bott Page 1 of 1

It is certified that error appears in the above-identified patent and that said Letters Patent is hereby corrected as shown below:

In particular, in Column 8, line 37 (line 2 in Claim 10), after the word "rigidly" please change "Connected" to correctly read: --connected--.

Signed and Sealed this

Twenty-first Day of April, 2009

JOHN DOLL  
*Acting Director of the United States Patent and Trademark Office*